(12) United States Patent
Wu et al.

(10) Patent No.: US 12,229,373 B2
(45) Date of Patent: Feb. 18, 2025

(54) LIQUID CRYSTAL HANDWRITING PANEL, HANDWRITING DEVICE, AND METHOD FOR CONTROLLING SAME

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Xiuliang Wang, Beijing (CN); Jian Wang, Beijing (CN); Yu Zhao, Beijing (CN); Yang Ge, Beijing (CN); Jiaxing Wang, Beijing (CN); Yao Bi, Beijing (CN); Jinshuai Duan, Beijing (CN); Hongliang Yuan, Beijing (CN); Tianyang Han, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,328

(22) PCT Filed: Oct. 28, 2021

(86) PCT No.: PCT/CN2021/127187
§ 371 (c)(1),
(2) Date: Oct. 25, 2022

(87) PCT Pub. No.: WO2023/070469
PCT Pub. Date: May 4, 2023

(65) Prior Publication Data
US 2024/0385718 A1 Nov. 21, 2024

(51) Int. Cl.
*G06F 3/044* (2006.01)
*G02F 1/1333* (2006.01)
(Continued)

(52) U.S. Cl.
CPC ........ *G06F 3/0443* (2019.05); *G02F 1/13338* (2013.01); *G06F 3/0412* (2013.01);
(Continued)

(58) Field of Classification Search
CPC ........ G06F 3/0412; G06F 3/044–0448; G09G 2300/0486; G09G 2300/0473
See application file for complete search history.

(56) References Cited

U.S. PATENT DOCUMENTS 8,947,604 B2 * 2/2015 Pishnyak ............ G02F 1/13338
349/185
9,134,561 B2 * 9/2015 Marhefka ............... G06F 3/045
(Continued)

FOREIGN PATENT DOCUMENTS

CN 201662667 U 12/2010
CN 102364413 A 2/2012
(Continued)

OTHER PUBLICATIONS

CN202180003125.8 first office action dated Oct. 31, 2024.

*Primary Examiner* — Patrick F Marinelli
(74) *Attorney, Agent, or Firm* — IPro, PLLC

(57) ABSTRACT

Provided is a liquid crystal handwriting panel. The liquid crystal handwriting panel includes: a first substrate and a second substrate that are opposite to each other, and a liquid crystal layer between the first substrate and the second substrate; wherein the first substrate includes: a first base substrate, a touch electrode layer on a side of the first base substrate, and a first drive electrode layer on a side of the first base substrate; the second substrate includes: a second base substrate, a second drive electrode layer on a side of the second base substrate, and a shielding layer on a side of the second base substrate.

15 Claims, 11 Drawing Sheets

(51) Int. Cl.
  *G06F 3/041* (2006.01)
  *G06T 11/20* (2006.01)
  *G09G 3/36* (2006.01)
(52) U.S. Cl.
  CPC .......... *G06F 3/0447* (2019.05); *G06T 11/203* (2013.01); *G09G 3/3648* (2013.01); *G09G 2300/0486* (2013.01)

(56) References Cited

U.S. PATENT DOCUMENTS

| | | | | |
|---|---|---|---|---|
| 10,379,662 | B2* | 8/2019 | Kim | G06F 3/0446 |
| 11,137,899 | B2* | 10/2021 | Li | G02F 1/13338 |
| 2008/0266278 | A1* | 10/2008 | Lee | G02F 1/13338 |
| | | | | 345/204 |
| 2011/0248941 | A1 | 10/2011 | Abdo et al. | |
| 2012/0099030 | A1* | 4/2012 | Pishnyak | G02F 1/13718 |
| | | | | 349/1 |
| 2013/0147740 | A1* | 6/2013 | Wang | G06F 3/041 |
| | | | | 345/173 |
| 2016/0328051 | A1 | 11/2016 | Shishido et al. | |
| 2017/0115515 | A1* | 4/2017 | Miyake | H01L 27/1225 |
| 2020/0142581 | A1* | 5/2020 | Li | G06F 3/0445 |
| 2024/0231603 | A1* | 7/2024 | Wu | G06F 3/04883 |
| 2024/0272467 | A1* | 8/2024 | Wang | G02F 1/1347 |
| 2024/0312427 | A1* | 9/2024 | Guo | G09G 3/3677 |

FOREIGN PATENT DOCUMENTS

| | | |
|---|---|---|
| CN | 202433807 U | 9/2012 |
| CN | 106125971 A | 11/2016 |
| CN | 107329625 A | 11/2017 |
| CN | 207148786 U | 3/2018 |
| CN | 208780961 U | 4/2019 |
| CN | 111061397 A | 4/2020 |
| CN | 111316208 A | 6/2020 |
| CN | 108828821 B | 1/2021 |
| CN | 112180628 A | 1/2021 |
| CN | 213150022 U | 5/2021 |
| CN | 112987366 A | 6/2021 |
| JP | 2013195910 A | 9/2013 |
| TW | M553011 | * 12/2017 |

* cited by examiner

B-B'

LIQUID CRYSTAL HANDWRITING PANEL, HANDWRITING DEVICE, AND METHOD FOR CONTROLLING SAME

CROSS-REFERENCE TO RELATED APPLICATION

This application is a U.S. national stage of international application No. PCT/CN2021/127187, filed on Oct. 28, 2021, the content of which is incorporated herein by reference in its entirety.

TECHNICAL FIELD

The present disclosure relates to the field of display technologies, and in particular, relates to a liquid crystal handwriting panel, a handwriting device, and a method for controlling the same.

BACKGROUND

A handwriting board is an electronic device for achieving word writing and drawing. A liquid crystal handwriting panel has less power consumption and clear handwriting, and thus is widely used in recent years.

SUMMARY

Embodiments of the present disclosure provide a liquid crystal handwriting panel, a handwriting device, and a method for controlling the same. The technical solutions are as follows.

According to some embodiments of the present disclosure, a liquid crystal handwriting panel is provided. The liquid crystal handwriting panel includes: a first substrate and a second substrate that are opposite to each other, and a liquid crystal layer between the first substrate and the second substrate; wherein
the first substrate includes: a first base substrate, a touch electrode layer on a side of the first base substrate, and a first drive electrode layer on a side of the first base substrate, wherein the first drive electrode layer is closer to the liquid crystal layer than the touch electrode layer to the liquid crystal layer; and
the second substrate includes: a second base substrate, a second drive electrode layer on a side of the second base substrate, and a shielding layer on a side of the second base substrate,
wherein one of the first drive electrode layer and the second drive electrode layer includes a plurality of pixel electrodes, and the other of the first drive electrode layer and the second drive electrode layer includes a common electrode.

In some embodiments, the touch electrode layer includes: a plurality of touch electrode blocks, wherein an orthogonal projection of each of the plurality of touch electrode blocks on the first base substrate are overlapped with an orthogonal projection of at least one of the plurality of pixel electrodes on the first base substrate; and
the first substrate further includes: a plurality of touch signal lines, wherein the plurality of touch signal lines are electrically connected to the plurality of touch electrode blocks in one-to-one correspondence.

In some embodiments, in a case that the first drive electrode layer includes the plurality of pixel electrodes, the first substrate further includes: a plurality of data lines and a plurality of thin-film transistors, wherein the plurality of data lines are electrically connected to the plurality of pixel electrodes by the plurality of thin-film transistors, and
the plurality of data lines and the plurality of touch signal lines are disposed on a same layer and made of a same material.

In some embodiments, the first substrate further includes: a first insulation layer between the plurality of touch signal lines and the touch electrode layer, wherein the first insulation layer is provided with a plurality of first vias, and the plurality of touch signal lines are electrically connected to the plurality of touch electrode blocks by at least one of the plurality of first vias.

In some embodiments, the first substrate further includes: a second insulation layer between the first drive electrode layer and the touch electrode layer, wherein the touch electrode layer is closer to the first base substrate than the first drive electrode layer to the first base substrate.

In some embodiments, the liquid crystal handwriting panel further includes: a spacer between the first substrate and the second substrate, wherein the spacer is fixed on one of the first substrate and the second substrate.

In some embodiments, the first base substrate is a flexible base substrate, and both the touch electrode layer and the first drive electrode layer are disposed on a side, close to the second substrate, of the flexible base substrate.

In some embodiments, the first base substrate is a flexible base substrate, and both the touch electrode layer and the first drive electrode layer are disposed on a side, close to the second substrate, of the flexible base substrate; and
the second base substrate is a rigid base substrate, the first drive electrode layer includes the common electrode, and the second drive electrode layer includes the plurality of pixel electrodes.

According to some embodiments of the present disclosure, a handwriting device is provided. The handwriting device includes: the liquid crystal handwriting panel according to any one of above embodiments, and a control assembly electrically connected to the liquid crystal handwriting panel; wherein
the control assembly is configured to: determine, in response to the liquid crystal handwriting panel being in an erasing mode, position information of a region to be erased by the touch electrode layer, and apply a pixel voltage to a pixel electrode in the region to be erased, such that a voltage difference is present between the pixel electrode and the common electrode in the region to be erased.

In some embodiments, the control assembly is further configured to: determine, in response to the liquid crystal handwriting panel being in a writing mode, position information of handwriting by the touch electrode layer, and generate image information corresponding to the handwriting.

In some embodiments, a duration of applying the pixel voltage to the pixel electrode by the control assembly ranges from 150 ms to 650 ms, and
a period of sensing a touch position via the touch electrode layer by the control assembly ranges from 2 ms to 40 ms.

According to some embodiments of the present disclosure, a method for controlling a handwriting device is provided. The method is applicable to the handwriting device according to any one of above embodiments, and includes:
determining, in response to the liquid crystal handwriting panel being in an erasing mode, position information of a region to be erased by the touch electrode layer; and applying, based on the position information of the region to be erased, a pixel voltage to a pixel electrode in the region to be erased by the control assembly, such that a voltage difference is present between the pixel electrode and the common electrode in the region to be erased.

In some embodiments, the method further includes:

determining, in response to the liquid crystal handwriting panel being in a writing mode, position information of handwriting by the touch electrode layer, and generating image information corresponding to the handwriting.

In some embodiments, the method further includes:

determining a mode of the liquid crystal handwriting panel by detecting an external object in contact with the first substrate by the touch electrode layer;

determining, in response to the liquid crystal handwriting panel being in the erasing mode, position information of the external object in contact with the first substrate as the position information of the region to be erased; and determining, in response to the liquid crystal handwriting panel being in the writing mode, position information of the external object in contact with the first substrate as the position information of the handwriting.

In some embodiments, determining the mode of the liquid crystal handwriting panel by detecting the external object in contact with the first substrate by the touch electrode layer includes:

determining the mode of the liquid crystal handwriting panel by detecting an area of a contact region of the external object and the first substrate by the touch electrode layer, and/or a change of a capacitance in response to the external object being in contact with the first substrate.

BRIEF DESCRIPTION OF THE DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION

To make the objectives, technical solutions, and advantages of the present disclosure clearer, the embodiments of the present disclosure are further described in detail hereinafter with reference to the accompanying drawings.

In some practices, an infrared positioning device is integrated in the liquid crystal handwriting panel to achieve local erasing of handwriting displayed on the liquid crystal handwriting panel. In the case that the handwriting displayed on the liquid crystal handwriting panel is erased by an erasing tool (for example, an eraser), a position of the erasing tool on the liquid crystal handwriting panel is determined by the infrared positioning device, so as to determine a region to be erased in the liquid crystal handwriting panel. Then the liquid crystal handwriting panel controls pixel electrodes in the region to be erased to erase the handwriting in the region to be erased.

However, a thickness of the liquid crystal handwriting panel is great after the infrared positioning device is integrated in the liquid crystal handwriting panel.

Figure 1:
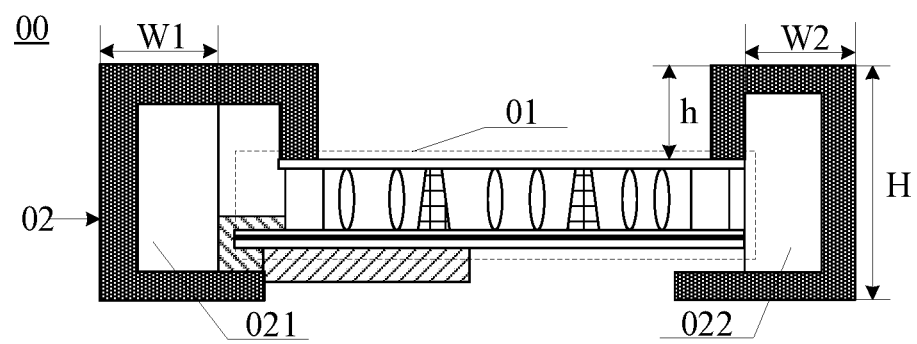
FIG. 1 is a sectional view of a liquid crystal handwriting panel in some practices.
Figure 2:
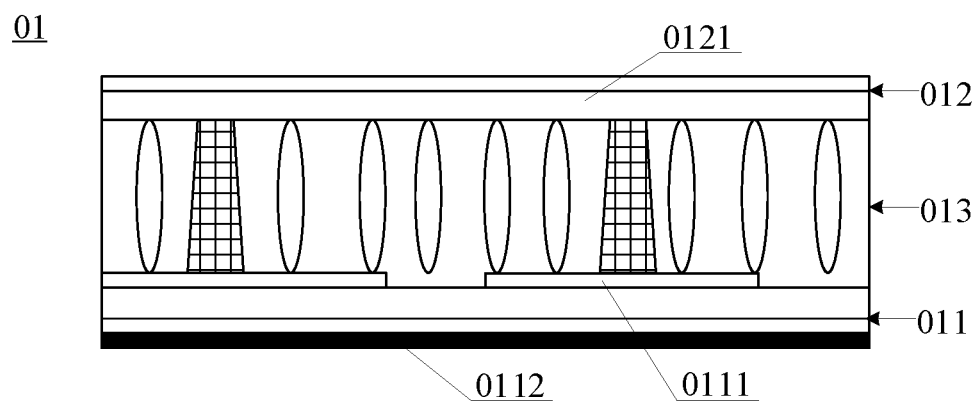
FIG. 2 is a schematic diagram of a film layer structure of a liquid crystal panel of the liquid crystal handwriting panel in FIG. 1.

Referring to FIG. 1 and FIG. 2, FIG. 1 is a sectional view of a liquid crystal handwriting panel in some practices, and FIG. 2 is a schematic diagram of a film layer structure of a liquid crystal panel of the liquid crystal handwriting panel in FIG. 1. The liquid crystal handwriting panel 00 generally includes: a liquid crystal panel 01 and an infrared positioning device 02.

The liquid crystal panel 01 includes: a first substrate 011 and a second substrate 012 that are opposite to each other, and a liquid crystal layer 013 between the first substrate 011 and the second substrate 012. The first substrate 011 generally includes a plurality of pixel electrodes 0111 arranged in an array and a shielding layer 0112 (for example, a black coating layer or a black aluminum honeycomb plate). The plurality of pixel electrodes 0111 are closer to the second substrate 012 than the shielding layer 0112 to the second substrate 012. The second substrate 012 includes a planar common electrode 0121. In some embodiments, liquid crystal molecules in the liquid crystal layer 013 are bistable liquid crystal molecules.

The infrared positioning device 02 in the liquid crystal handwriting panel 00 includes: a fixture 021, an infrared emission unit 022, and an infrared receiving unit 023. The fixture 021 is configured to fix the infrared emission unit 022 and the infrared receiving unit 023, is generally disposed on a periphery of the liquid crystal panel 01, and is higher than a display face of the liquid crystal panel 01. For example, a height difference h is present between an end face of the fixture 021 and the display face of the liquid crystal panel 01. The infrared emission unit 022 emits infrared light to the infrared receiving unit 023, and a position of an external object (for example, a writing tool or erasing tool) on the liquid crystal panel 01 is determined based on infrared light received by the infrared receiving unit 023.

In the case that the liquid crystal handwriting panel 00 is in a writing mode, the writing tool (for example, a writing pen) applies a pressure to the liquid crystal panel 01, such that some of the liquid crystal molecules in the liquid crystal layer 013 in the liquid crystal panel 01 transform from a focal conic texture to a planar texture under the reaction of the outer pressure. As such, the liquid crystal molecules transformed to the planar texture reflect light at a specific wavelength (for example, green light) in the emitted ambient light, such that the liquid crystal handwriting panel displays handwriting. In addition, in writing by the writing tool, a moving trajectory of the writing tool is determined by the infrared positioning device 02, such that the liquid crystal handwriting panel generates image information corresponding to the handwriting based on the moving trajectory. Then, the liquid crystal handwriting panel sends the image information to other display device (for example, a computer or a mobile phone), such that the other display device displays the handwriting on the liquid crystal handwriting panel.

In the case that the liquid crystal handwriting panel 00 is in an erasing mode, the erasing tool (for example, an eraser) moves on the liquid crystal handwriting panel 00. The liquid crystal handwriting panel 00 determines a position of the erasing tool on the liquid crystal panel 01 based on infrared light emitted by the infrared positioning device 02, and further determines a region to be erased in the liquid crystal handwriting panel 00. The liquid crystal handwriting panel applies a voltage to a pixel electrode in the region to be erased, such that a voltage difference is present between the pixel electrode and a common electrode in the region to be erased. Furthermore, liquid crystal molecules in the region to be erased are rearranged under the reaction of the voltage difference, that is, liquid crystal molecules transform from a planar texture to a focal conic texture. As such, the liquid crystal molecules transformed to the focal conic texture transmit the emitted ambient light, such that the region to be erased shows a background at the same color as the shielding layer 0112, and the handwriting in the region to be erased is erased.

However, to ensure that the infrared positioning device 02 accurately determines the external object (for example, the writing tool or erasing tool) in contact with the liquid crystal panel 01, the height difference h between the end face of the fixture 021 and the display face of the liquid crystal panel 01 is great enough, such that the infrared light emitted by the infrared emission unit 022 in the infrared positioning device 02 is received by the infrared receiving unit 023. As such, a thickness of the liquid crystal handwriting panel 00 is great.

In addition, as the infrared emission unit 022 and the infrared receiving unit 023 are fixed by the fixture 021, and the fixture 021 is disposed on the periphery of the liquid crystal panel 01, W1 and W2 of borders of the liquid crystal handwriting panel 00 are greater, such that a screen-to-body ratio of the liquid crystal handwriting panel 00 is less.

Figure 3:
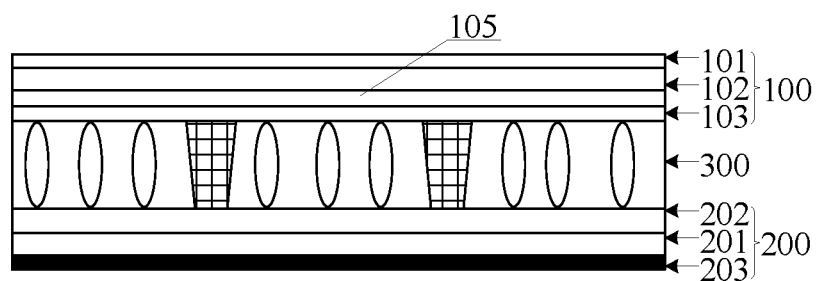
FIG. 3 is a schematic structural diagram of a liquid crystal handwriting panel according to some embodiments of the present disclosure.

Referring to FIG. 3, FIG. 3 is a schematic structural diagram of a liquid crystal handwriting panel according to some embodiments of the present disclosure. The liquid crystal handwriting panel 000 includes: a first substrate 100 and a second substrate 200 that are opposite to each other, and a liquid crystal layer 300 between the first substrate 100 and the second substrate 200.

The first substrate 100 in the liquid crystal handwriting panel 000 includes: a first base substrate 101, a touch electrode layer 102 on a side of the first base substrate 101, and a first drive electrode layer 103 on a side of the first base substrate 101. In some embodiments, both the touch electrode layer 102 and the first drive electrode layer 103 are disposed on a side, close to the second substrate 200, of the first base substrate 101. The first drive electrode layer 103 is closer to the liquid crystal layer 300 than the touch electrode layer 102 to the liquid crystal layer 300.

The second substrate 200 in the liquid crystal handwriting panel 000 includes: a second base substrate 201, a second drive electrode layer 202 on a side of the second base substrate 201, and a shielding layer 203 on a side of the second base substrate 201. The shielding layer 203 is a black film layer, such that light transmitted from the first substrate 100 and the second substrate 200 is absorbed by the shielding layer 203, and the liquid crystal handwriting panel shows a black background. In some embodiments, the second drive electrode layer 202 is disposed on a side, close to the first substrate 100, of the second base substrate 201, and the shielding layer 203 is disposed on a side, distal from the first substrate 100, of the second base substrate 201, or the shielding layer 203 is disposed on the side, close to the first substrate 100, of the second base substrate. It should be noted that, in the case that both the second drive electrode layer 202 and the shielding layer 203 are disposed on the side, close to the first substrate 100, of the second base substrate, the second drive electrode layer 202 is closer to the liquid crystal layer 300 than the shielding layer 203 to the liquid crystal layer 300, and an insulation layer is disposed between the second drive electrode layer 202 and the shielding layer 203, such that the second drive electrode layer 202 is insulated from the shielding layer 203 to prevent the shielding layer 203 with the conductivity from affecting an electric signal loaded on the second drive electrode layer 202.

In the embodiments of the present disclosure, one of the first drive electrode layer 103 and the second drive electrode layer 202 includes a plurality of pixel electrodes 400 (not annotated in FIG. 3, and annotated in sequential drawings), and the other of the first drive electrode layer 103 and the second drive electrode layer 202 includes a common electrode 500 (not annotated in FIG. 3, and annotated in sequential drawings). That is, in the case that the first drive electrode layer 103 includes a plurality of pixel electrodes 400, the second drive electrode layer 202 includes a common electrode 500. In the case that the first drive electrode layer 103 includes a common electrode 500, the second drive electrode layer 202 includes a plurality of pixel electrodes 400. The plurality of pixel electrodes 400 are in a block shape and arranged in the liquid crystal handwriting panel 000 in an array, and the common electrode 500 is a planar electrode.

The liquid crystal layer 300 in the liquid crystal handwriting panel 000 is a bistable liquid crystal molecule layer. That is, liquid crystal molecules in the liquid crystal layer 300 are bistable liquid crystal molecules.

Figure 4:
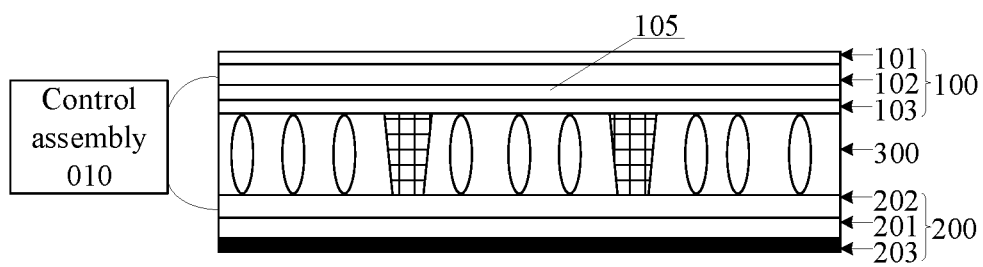
FIG. 4 is a schematic structural diagram of a handwriting device according to some embodiments of the present disclosure.

In the present disclosure, in the case that the liquid crystal handwriting panel in FIG. 3 is integrated in a handwriting device, referring to FIG. 4, FIG. 4 is a schematic structural diagram of a handwriting device according to some embodiments of the present disclosure. The handwriting device 001 includes: a liquid crystal handwriting panel 000 and a control assembly 010. The liquid crystal handwriting panel 000 is the liquid crystal handwriting panel in FIG. 3, and the control assembly 010 is electronically connected to the liquid crystal handwriting panel 000.

In some embodiments, in the case that the first drive electrode layer 103 in the first substrate 100 includes a plurality of pixel electrodes 400, and the second drive electrode layer 202 in the second substrate 200 includes a common electrode 500, the control assembly 010 in the handwriting device 001 is electronically connected to the first substrate 100. In this case, the control assembly 010 is electronically connected to the touch electrode layer 102 in the first substrate 100 and the plurality of pixel electrodes 400.

In some embodiments, in the case that the first drive electrode layer 103 in the first substrate 100 includes a common electrode 500, and the second drive electrode layer 202 in the second substrate 200 includes a plurality of pixel electrodes 400, the control assembly 010 in the handwriting device 001 is electronically connected to the first substrate 100 and the second substrate 200. In this case, the control assembly 010 is electronically connected to the touch electrode layer 102 in the first substrate 100, the common electrode 500, and the plurality of pixel electrodes 400 in the second substrate 200.

In this case, the control assembly 010 is further configured to: determine, in response to the liquid crystal handwriting panel 000 being in an erasing mode, position information of a region to be erased by the touch electrode layer 102, and apply a pixel voltage to a pixel electrode 400 in the region to be erased, such that a voltage difference is present between the pixel electrode 400 and the common electrode 500 in the region to be erased.

In the embodiments of the present disclosure, the control assembly 010 is further configured to: determine, in response to the liquid crystal handwriting panel 000 being in a writing mode, position information of handwriting by the touch electrode layer 102, and generate image information corresponding to the handwriting.

It should be noted that, in the case that the external object (for example, the writing tool or erasing tool) is in contact with the first substrate 100 in the liquid crystal handwriting panel 000, a capacitance of a contact region of the external object and the first substrate 100 changes, a region with changed capacitance is sensed by the touch electrode layer 102 in first substrate 100, and a position of the contact region of the external object and the first substrate 100 is further determined.

In the case that the liquid crystal handwriting panel 000 is in a writing mode, and the writing tool (for example, a writing pen or a finger) is in contact with the first substrate 100 in the liquid crystal handwriting panel 000 and applies a pressure on the first substrate 100, some of bistable liquid crystal molecules in the liquid crystal layer 300 in the liquid crystal handwriting panel 000 transform from a focal conic texture to a planar texture under the reaction of the outer pressure. As such, the bistable liquid crystal molecules in the planar texture reflect light at a specific wavelength (for example, green light) in the ambient light irradiated on the liquid crystal handwriting panel 000, such that the liquid crystal handwriting panel 000 displays corresponding handwriting. In addition, in writing by the writing tool, the control assembly 010 determines position information of the writing tool in contact with the first substrate 100 by the touch electrode layer 102, such that position information of the handwriting is determined, and image information corresponding to the handwriting is generated. In addition, the handwriting device achieves a function of saving the handwriting. Then, the control assembly 010 sends the image information to other display device (for example, a computer or a mobile phone), such that other display device displays the handwriting on the liquid crystal handwriting panel 000.

In the case that the liquid crystal handwriting panel 000 is in an erasing mode, and the erasing tool (for example, an eraser or palm) is in contact with the first substrate 100 in the liquid crystal handwriting panel 000, a capacitance of a contact region of the first substrate 100 and the erasing tool changes. The contact region of the first substrate 100 and the erasing tool is a region to be erased. As such, the control assembly 010 determines position information of the region to be erased by the touch electrode layer 102, and applies, based on the position information of the region to be erased, a voltage on a pixel electrode 400 in the region to be erased, such that a voltage difference is present between the pixel electrode 400 and the common electrode 500 in the region to be erased. Furthermore, liquid crystal molecules in the region to be erased in the liquid crystal handwriting panel 000 are rearranged under the reaction of the voltage difference, that is, liquid crystal molecules transform from a planar texture to a focal conic texture. As such, the liquid crystal molecules transformed to the focal conic texture transmit the emitted ambient light, such that the region to be erased shows a black background with the same color as the shielding layer 203, and a function of erasing the handwriting in local region by the handwriting device is achieved.

In the embodiments of the present disclosure, the position of the contact region of the external object (for example, the erasing tool or writing tool) and the first substrate 100 is determined by the touch electrode layer 102 in the first substrate 100, such that a function of saving or erasing the handwriting by the handwriting device is achieved. The infrared positioning device is not disposed in the liquid crystal handwriting panel 000, such that a thickness of the liquid crystal handwriting panel 000 is reduced, and a screen-to-body ratio of the liquid crystal handwriting panel 000 is improved.

In summary, the liquid crystal handwriting panel provided in the embodiments of the present disclosure includes: a first substrate and a second substrate that are opposite to each other, and a liquid crystal layer between the first substrate and the second substrate. The first substrate in the liquid crystal handwriting panel includes a touch electrode layer. By disposing the touch electrode layer in the first substrate, the position of the contact region of the external object and the first substrate is determined. For example, in the case that the liquid crystal handwriting panel is in an erasing mode, the control assembly determines the position of the contact region of the erasing tool and the first substrate by the touch electrode layer, and the position is a position of the region to be erased. After the control assembly applies a pixel voltage to a pixel electrode in the region to be erased, the handwriting device achieves a function of erasing the handwriting. For example, in the case that the liquid crystal handwriting panel is in a writing mode, the control assembly determines the position of the contact region of the writing tool and the first substrate by the touch electrode layer, and the position is the position of the handwriting. After the control assembly generates image information corresponding to the handwriting, the handwriting device achieves a function of saving the handwriting. The infrared positioning device is not disposed in the liquid crystal handwriting panel, and the touch electrode layer is disposed in the first substrate to achieve a function of saving or erasing the handwriting, such that a thickness of the liquid crystal handwriting panel and weights of borders of the liquid crystal handwriting panel are reduced, and a screen-to-body ratio of the liquid crystal handwriting panel is improved.

In the embodiments of the present disclosure, the control assembly 010 determines a mode of the liquid crystal handwriting panel 000 by detecting an external object in contact with the first substrate 100 by the touch electrode layer 102. For example, upon determining the liquid crystal handwriting panel 000 being in the erasing mode, the control assembly 010 determines the position information of the external object in contact with the first substrate 100 as the position information of the region to be erased. Upon determining the liquid crystal handwriting panel 000 being in the writing mode, the control assembly 010 determines the position information of the external object in contact with the first substrate 100 as the position information of the handwriting.

Determining, by the control assembly 010, the mode of the liquid crystal handwriting panel by detecting the external object in contact with the first substrate by the touch electrode layer is achieved in many manners, and the embodiments of the present disclosure are illustrated by following three types of embodiments.

In the first embodiments, after the external object is in contact with the first substrate 100, a capacitance of a region, in contact with the external object, of the first substrate 100 changes, and an area of the region with changed capacitance is sensed by the touch electrode layer 102, so as to acquire the area of the contact region of the external object and the first substrate 100. As such, the control assembly 010 distinguishes the writing mode and the erasing mode by detecting the area of the contact region of the external object and the first substrate 100 by the touch electrode layer 102. For example, in the case that the area of the contact region of the external object and the first substrate 100 is great, the control assembly 010 determines that the liquid crystal handwriting panel 000 is in the erasing mode, and thus, the external object is the erasing tool. In the case that the area of the contact region of the external object and the first substrate 100 is less, the control assembly 010 determines that the liquid crystal handwriting panel 000 is in the writing mode, and thus, the external object is the writing tool.

In the second embodiments, in the case that the external objects with different materials are in contact with the first substrate 100, capacitances of regions, in contact with the external objects with different materials, of the first substrate 100 change differentially, changes of the capacitances are sensed by the touch electrode layer 102, and the external object with which material in contact with the first substrate 100 is determined. As such, the writing tool and the erasing tool are prepared by different materials, and the control assembly 010 distinguishes the writing mode and the erasing mode by detecting the changes of the capacitances by the touch electrode layer 102 after the external object is in contact with the first substrate 100. For example, in the case that the change of the capacitance after the external object is in contact with the first substrate 100 falls within a range of the change of the capacitance after the erasing tool is in contact with the first substrate 100, the control assembly 010 determines that the liquid crystal handwriting panel 000 is in the erasing mode. In the case that the change of the capacitance after the external object is in contact with the first substrate 100 falls within a range of the change of the capacitance after the writing tool is in contact with the first substrate 100, the control assembly 010 determines that the liquid crystal handwriting panel 000 is in the writing mode.

In the third embodiments, after the external object is in contact with the first substrate 100, the handwriting device 001 determines the mode of the liquid crystal handwriting panel 000 by detecting the area of the contact region of the external object and the first substrate 100 and the change of the capacitance after the external object is in contact with the first substrate 100 by the touch electrode layer 102.

For example, after the external object is in contact with the first substrate 100, a ratio of the change of the capacitance to the area of the contact region falls within a threshold range corresponding to the erasing tool, such that the control assembly 010 determines that the liquid crystal handwriting panel 000 is in the erasing mode. After the external object is in contact with the first substrate 100, a ratio of the change of the capacitance to the area of the contact region falls within a threshold range corresponding to the writing tool, such that the control assembly 010 determines that the liquid crystal handwriting panel 000 is in the writing mode.

In some embodiments, the handwriting device determines the mode of the liquid crystal handwriting panel 000 by interacting (for example, an eraser indicates the erasing mode or a writing mode of the liquid crystal handwriting panel) with the erasing tool (for example, the eraser). In some embodiments, the handwriting device determines the mode of the liquid crystal handwriting panel 000 by external instructions.

Figure 5:
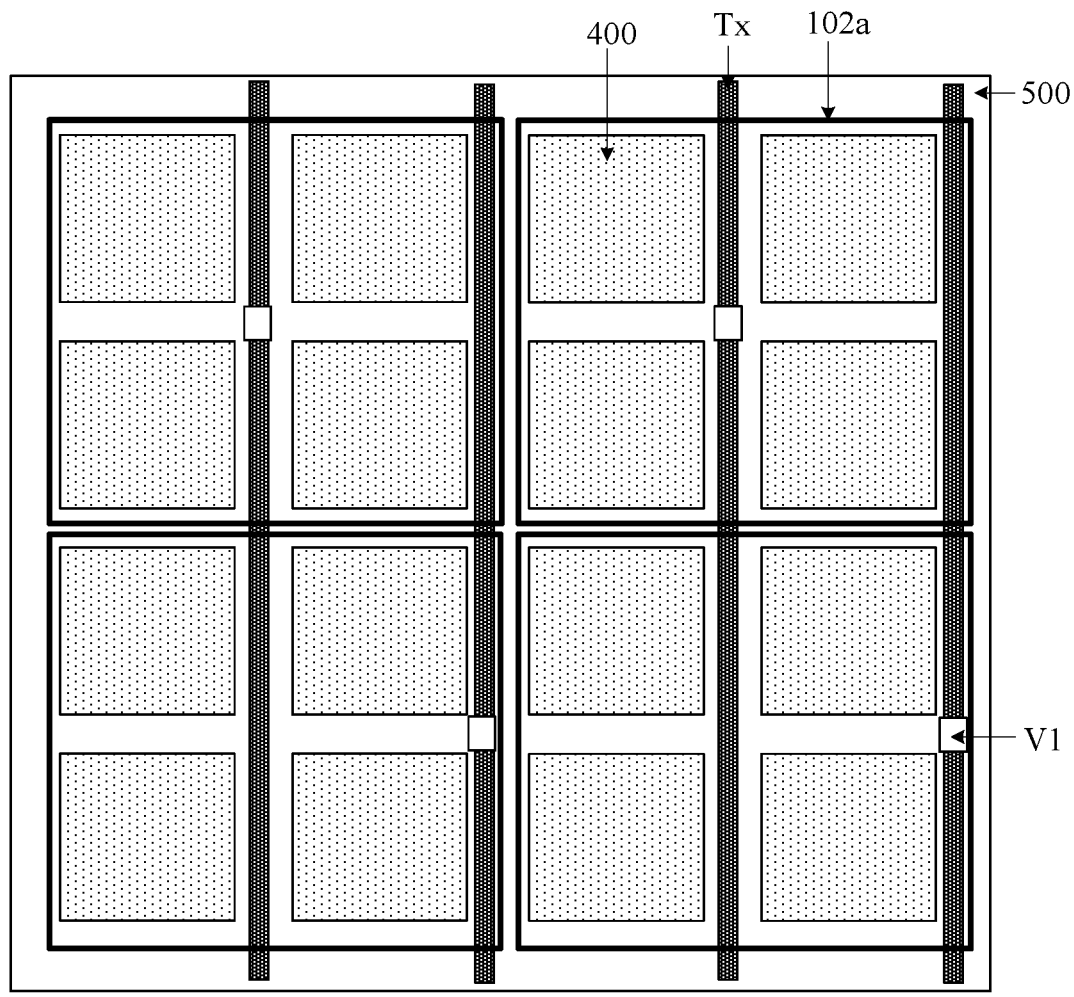
FIG. 5 is a top view of another liquid crystal handwriting panel according to some embodiments of the present disclosure.

In the embodiments of the present disclosure, referring to FIG. 5, FIG. 5 is a top view of another liquid crystal handwriting panel according to some embodiments of the present disclosure. The touch electrode layer 102 in the liquid crystal handwriting panel 000 includes a plurality of touch electrode blocks. An orthogonal projection of each of the plurality of touch electrode blocks 102a in the touch electrode layer 102 on the first base substrate 101 is overlapped with an orthogonal projection of at least one of the plurality of pixel electrodes 400 on the first base substrate 101. For example, each touch electrode block 102a corresponds to at least one pixel electrode 400, and an orthogonal projection of each pixel electrode 400 on the first base substrate 101 falls within an orthogonal projection of the corresponding touch electrode block 102a on the first base substrate 101.

In the embodiments of the present disclosure, numbers of the pixel electrodes 400 corresponding to the touch electrode blocks 102a are equal, such that an effect of erasing the handwriting on the liquid crystal handwriting panel 000 is ensured. In some embodiments, the number of the pixel electrodes 400 is integral multiples of the number of the touch electrode blocks 102a in the touch electrode layer 102.

For example, in FIG. 5, each touch electrode block 102a corresponds to four pixel electrodes 400, and the four pixel electrodes 400 are arranged in two rows and two columns. In this case, regions of the four pixel electrodes 400 corresponding to each touch electrode block 102a form a smallest erasable region. After the touch electrode block 102a corresponding to the four pixel electrodes 400 senses the change of the capacitance, the handwriting displayed in the smallest erasable region formed by the regions of the four pixel electrodes 400 is erased. As such, a size of the minimum touch unit (that is, a size of single touch electrode block 102a) is equal to a size of the smallest erasable region, and the size of the smallest erasable region is adjusted by adjusting the size of single touch electrode block 102a.

In the embodiments of the present disclosure, as shown in FIG. 5, the first substrate 100 in the liquid crystal handwriting panel 000 further includes a plurality of touch signal lines Tx. The plurality of touch signal lines Tx are electrically connected to the plurality of touch electrode blocks 102a in one-to-one correspondence.

For example, each of the plurality of touch signal lines Tx in the liquid crystal handwriting panel 000 is electrically connected to the control assembly 010, and the control assembly 010 simultaneously applies touch signals to the plurality of touch signal lines Tx. After the external object is in contact with the first substrate 100 in the liquid crystal handwriting panel 000, the capacitance between the touch electrode blocks 102a in the contact region of the external object and the first substrate 100 changes, such that the touch signal loaded in the touch signal line Tx connected to the touch electrode blocks 102a in the contact region changes. Thus, the control assembly positions the region of the contact region of the external object and the first substrate 100 by sensing the touch signal line Tx with changed touch signal.

For example, the orthogonal projection of the pixel electrode 400 on the first base substrate 101 is not overlapped with the orthogonal projection of the touch signal line Tx on the first base substrate 101, such that the touch signal loaded on the touch signal line Tx does not interfere the pixel voltage loaded on the pixel electrode 400, and the ambient light emitted by the bistable liquid crystal molecules at the planar texture in the region of the pixel electrode 400 is not shielded by the touch signal line Tx. Thus, the display effect of the handwriting by the liquid crystal handwriting panel 000 is great. In the present disclosure, the plurality of pixel electrodes 400 in the liquid crystal handwriting panel 000 are arranged in an array, and at least one touch signal line Tx is arranged between two adjacent columns of pixel electrodes 400.

In some embodiments, orthogonal projections of the touch signal lines Tx on the first base substrate 101 are distributed evenly or regularly. For example, numbers of the touch signal lines Tx arranged between two columns of pixel electrodes 400 are equal, or same column numbers of the pixel electrodes 400 are arranged between two adjacent touch signal lines Tx. As such, the touch signal lines Tx are distributed evenly or almost evenly in the first substrate 100, such that the display effect of the handwriting by the liquid crystal handwriting panel 000 is further improved.

Figure 6:
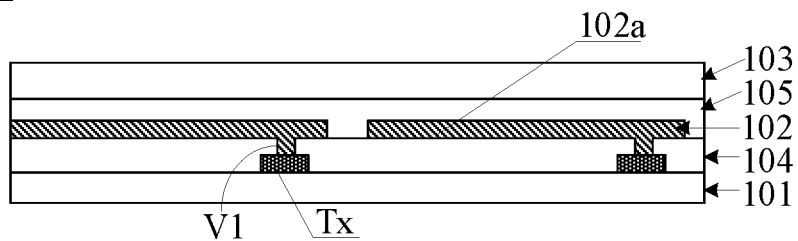
FIG. 6 is a schematic diagram of a film layer structure of a first substrate according to some embodiments of the present disclosure.

In the embodiments of the present disclosure, referring to FIG. 5 and FIG. 6, FIG. 6 is a schematic diagram of a film layer structure of a first substrate according to some embodiments of the present disclosure. The first substrate 100 in the liquid crystal handwriting panel 000 further includes a first insulation layer 104 between the plurality of touch signal lines Tx and the touch electrode layer 102. The first insulation layer 104 is provided with a plurality of first vias V1, and the plurality of touch signal lines Tx are electrically connected to the plurality of touch electrode blocks 102a by at least one of the plurality of first vias V1.

Illustratively, FIG. 5 is illustrated by taking each of the plurality of touch signal lines Tx in the first substrate 100 being electrically connected to corresponding touch electrode block 102a by one first via V1 as an example.

In some embodiments, each of the plurality of touch signal lines Tx is electrically connected to the corresponding touch electrode block 102a by a plurality of first vias V1, and numbers of the first vias V1 for connecting the touch signal lines Tx to corresponding touch electrode blocks 102a are equal. As such, the plurality of first vias V1 in the first insulation layer 104 are evenly arranged, and the display effect of the handwriting by the liquid crystal handwriting panel 000 is further improved.

In addition, in the case that the touch signal line Tx is electrically connected to the corresponding touch electrode block 102a by a plurality of first vias V1, the voltages on different positions of the touch electrode block 102a are substantially equal after the touch signal line Tx applies the touch signal to corresponding touch electrode block 102a, such that a precision of positioning the contact region of the external object and the first substrate 100 by the touch electrode layer 102 is further improved.

In some embodiments, the first substrate 100 in the liquid crystal handwriting panel 000 further includes a second insulation layer 105 between the first drive electrode layer 103 and the touch electrode layer 102. The touch electrode layer 102 is disposed on a side closer to the first base substrate 101 than the first drive electrode layer 103. In this case, the position information of the contact region of the external object and the first substrate 100 is determined by the touch electrode layer 102. In the embodiments of the present disclosure, the interference on the touch electrode layer 102 is avoided in response to the voltage (the pixel voltage or the common electrode) applied to the first drive electrode layer 103 by the second insulation layer 105 between the touch electrode layer 102 and the first drive electrode layer 103, so as to ensure normal operation of the touch electrode layer 102.

In the embodiments of the present disclosure, in the case that the liquid crystal handwriting panel 000 is in the erasing mode, the control assembly 010 applies the pixel voltage to the pixel electrode in the region to be erased. As a refresh rate of the liquid crystal handwriting panel 000 is generally less, a duration of applying the pixel voltage to the pixel electrode 400 by the control assembly 010 is generally great, such that a duration of forming the voltage difference between the pixel electrode 400 and the common electrode 500 is greater. Thus, the handwriting in the region to be erased is erased clearly, and the effect of erasing the region to be erased is great. Illustratively, the duration ranges from 150 ms to 650 ms. In some embodiments, the duration ranges from 200 ms to 600 ms.

In some embodiments, a period of sensing a touch position through the touch electrode layer 102 by the control assembly 010 ranges from 2 ms to 40 ms. In some embodiments, the period ranges from 5 ms to 20 ms.

In the embodiments of the present disclosure, the first base substrate 101 in the first substrate 100 is a flexible base substrate. As such, the external pressure controls the bistable liquid crystal molecules to transform from the focal conic texture to the planar texture. For example, the first base substrate 101 is a polyethylene terephthalate (PET) base substrate.

The second base substrate 201 in the second substrate 200 is a rigid base substrate. As such, the rigidity of the liquid crystal handwriting panel 000 is great. For example, the second base substrate 201 is a glass base substrate.

In some embodiments, materials of the touch electrode layer 102, the first drive electrode layer 103, and the second drive electrode layer 202 in the liquid crystal handwriting panel 000 include indium tin oxide (ITO), indium zinc oxide (IZO), or other transparent conductive material.

In the embodiments of the present disclosure, one of the first drive electrode layer 103 in the first substrate 100 and the second drive electrode layer 202 in the second substrate 200 includes a plurality of pixel electrodes 400, and the other of the first drive electrode layer 103 in the first substrate 100 and the second drive electrode layer 202 in the second substrate 200 includes a common electrode 500. Thus, the embodiments of the present disclosure are illustrated by following two types of embodiments.

Figure 7:
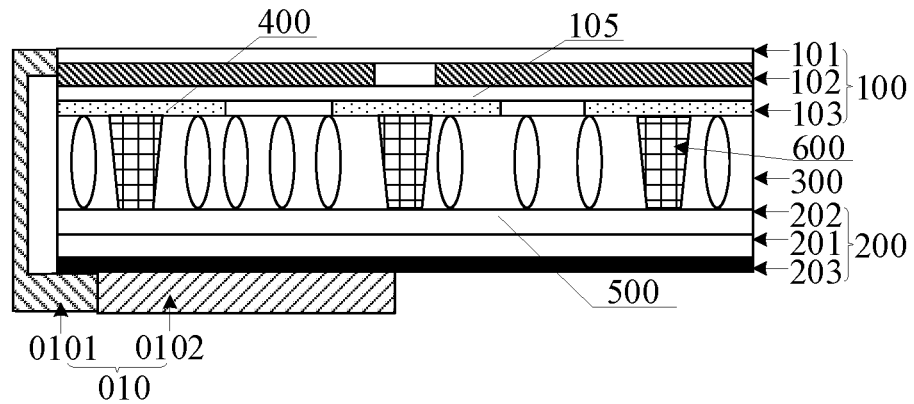
FIG. 7 is a schematic diagram of a film layer structure of another liquid crystal handwriting panel according to some embodiments of the present disclosure.

In the first embodiments, referring to FIG. 7, FIG. 7 is a schematic diagram of a film layer structure of another liquid crystal handwriting panel according to some embodiments of the present disclosure. The first drive electrode layer 103 in the first substrate 100 includes a plurality of pixel electrodes 400, and the second drive electrode layer 202 in the second substrate 200 includes a common electrode 500.

Figure 8:
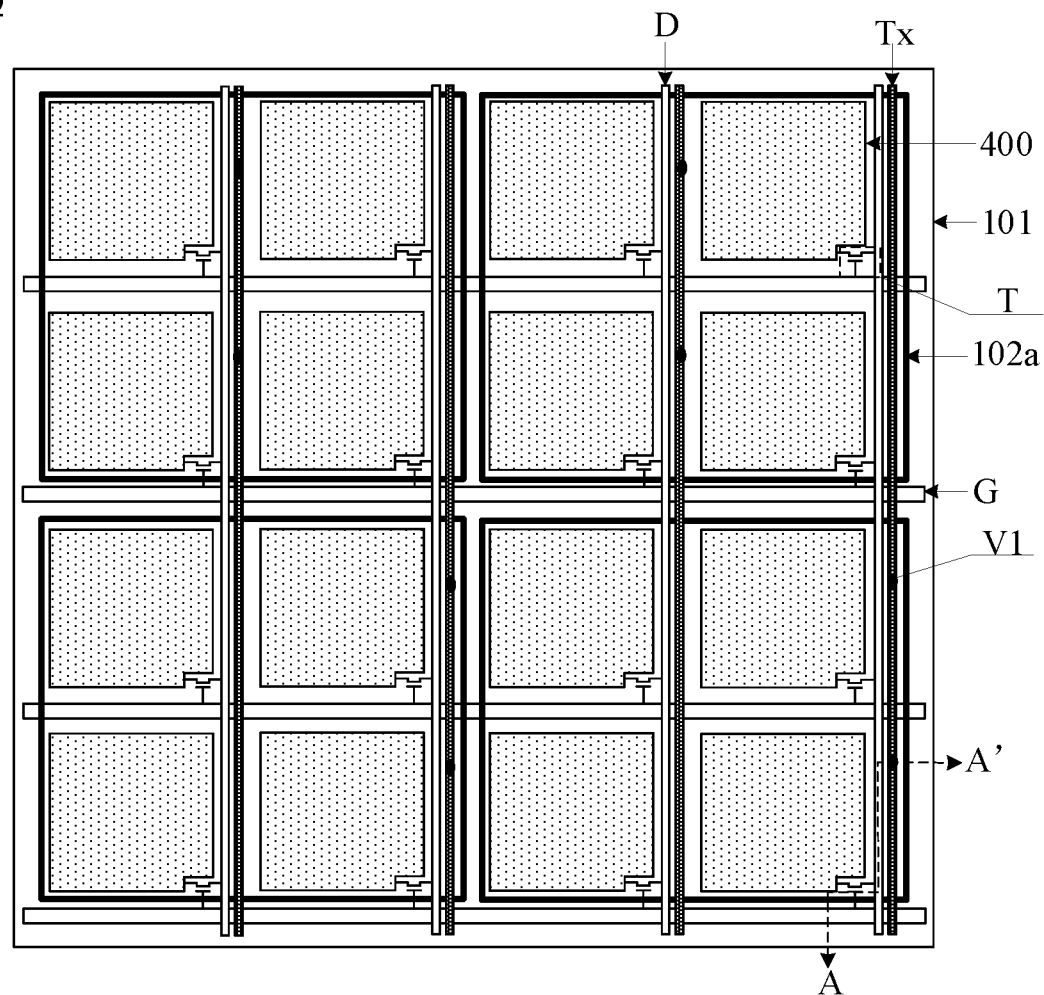
FIG. 8 is a top view of a first substrate in the liquid crystal handwriting panel in FIG. 7.
Figure 9:
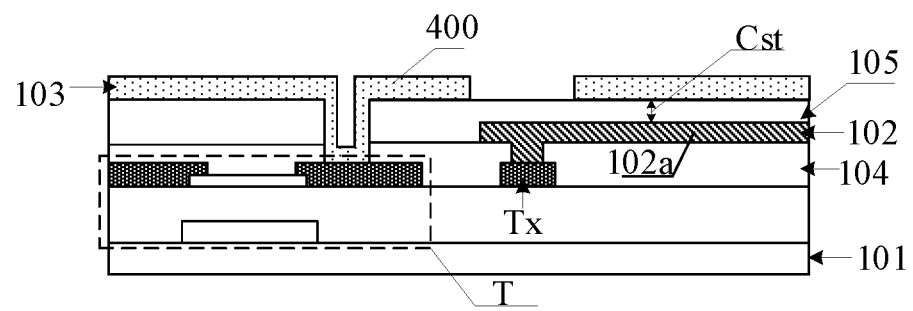
FIG. 9 is a schematic diagram of a film layer structure at A-A' in FIG. 8.

Referring to FIG. 8 and FIG. 9, FIG. 8 is a top view of a first substrate in the liquid crystal handwriting panel in FIG. 7, and FIG. 9 is a schematic diagram of a film layer structure at A-A' in FIG. 8. The first substrate 100 further includes: a plurality of data lines D and a plurality of thin-film transistors T. The plurality of data lines D are electrically connected to the plurality of pixel electrodes 400 by the plurality of thin-film transistors T. In the present disclosure, the first substrate 100 further includes a plurality of gate lines G. In some embodiments, the plurality of gate lines G are electrically connected to the plurality of pixel electrodes 400 by the plurality of thin-film transistors T.

In some embodiments, the plurality of data lines D are arranged in parallel, the plurality of gate lines G are arranged in parallel, and extension directions of the plurality of data lines D are perpendicular to extension directions of the plurality of gate lines G. As such, any two adjacent data lines D and any two adjacent gate lines G form a pixel region, and one pixel electrode 400 and one thin-film transistor T are disposed in each pixel region.

Each of the plurality of data lines D is electrically connected to first electrodes of thin-film transistors T in the same column of pixel regions, second electrodes of the thin-film transistors T in the pixel regions are electrically connected to the pixel electrode 400 in the pixel region, and each of the plurality of data lines D is electrically connected to gates of thin-film transistors T in the same row of pixel regions. It should be noted that, the first electrode of the thin-film transistor T is one of a source and a drain, and the second electrode is the other of the source and the drain. It should be further noted that the thin-film transistor T in the embodiments of the present disclosure is illustrated by taking a bottom gate thin-film transistor as an example. In some embodiments, the thin-film transistor is a top gate thin-film transistor, which is not limited in the embodiments of the present disclosure.

In the embodiments of the present disclosure, the plurality of data lines D and the plurality of touch signal lines Tx are disposed on the same layer and made of the same material. That is, the plurality of data lines D and the plurality of touch signal lines Tx are formed by one patterning process. It should be noted that, the one patterning process herein and one patterning process in the following embodiments include: photoresist coating, exposing, developing, etching, and photoresist removing. As such, the touch signal line Tx is integrated in the first drive electrode layer 103 without additional conductive pattern, such that cost of the manufacturing the liquid crystal handwriting panel 000 is efficiently reduced.

In the present disclosure, as the second insulation layer is disposed between the touch electrode layer 102 and the pixel electrode 400, a storage capacitance Cst is formed between the touch electrode layer 102 and the pixel electrode 400. The storage capacitance Cst is used to hold the pixel voltage of the pixel electrode 400. In addition, it is not necessary to dispose auxiliary electrode lines in the same layer as the gate lines G and used to form a storage capacitance with the pixel electrode 400 in the first substrate 100, such that the ambient light emitted by the bistable liquid crystal molecules at the planar texture is not shielded by the auxiliary electrode lines.

In the embodiments of the present disclosure, as shown in FIG. 7, the liquid crystal handwriting panel 000 further includes a spacer 600 between the first substrate 100 and the second substrate 200. The spacer 600 is fixed on one of the first substrate 100 and the second substrate 200. The spacer 600 in the liquid crystal handwriting panel 000 is formed by an elastic material, and elastically deforms in response to the external pressure on the liquid crystal handwriting panel 000. In addition, the spacer 600 supports the first substrate 100 and the second substrate 200, such that the effect on the arrangement of the liquid crystal molecules in the liquid crystal layer 300 caused by the pressure on the liquid crystal handwriting panel 000 is avoided, and the display effect of the liquid crystal handwriting panel 000 is ensured.

It should be noted that, as the spacer in the liquid crystal handwriting panel 000 is fixed on the first substrate 100 or the second substrate 200, the embodiments of the present disclosure are illustrated by the following two cases.

Figure 10:
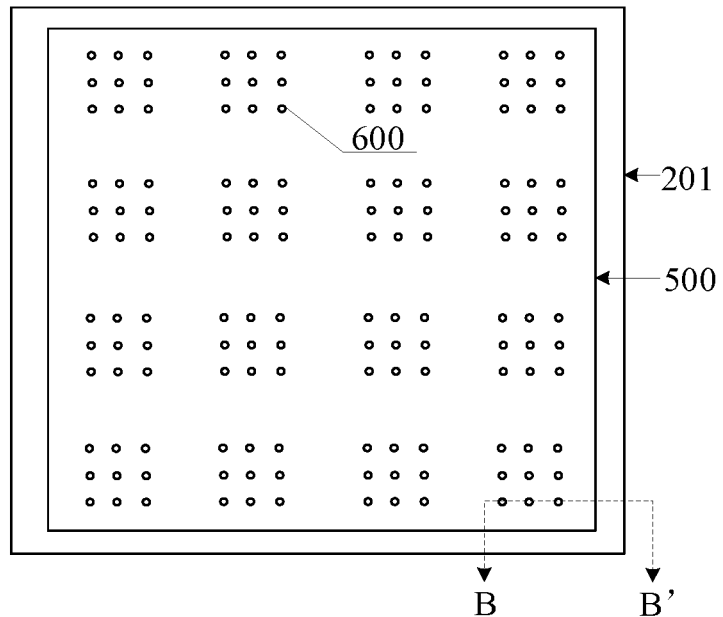
FIG. 10 is a top view of a second substrate in the liquid crystal handwriting panel in FIG. 7.
Figure 11:
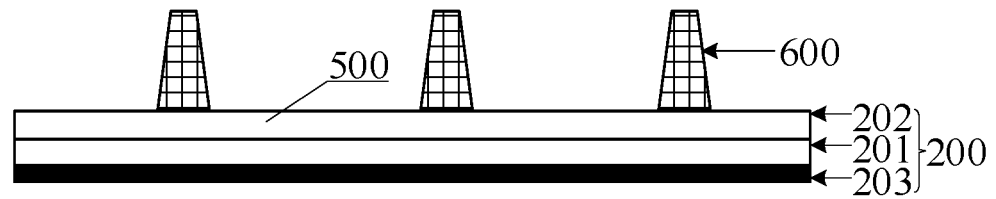
FIG. 11 is a schematic diagram of a film layer structure at B-B' in FIG. 10.

In a first case, in the case that the spacer in the liquid crystal handwriting panel 000 is fixed on the second substrate 200, referring to FIG. 10 and FIG. 11, FIG. 10 is a top view of a second substrate in the liquid crystal handwriting panel in FIG. 7, and FIG. 11 is a schematic diagram of a film layer structure at B-B' in FIG. 10. The spacer 600 in the liquid crystal handwriting panel 000 is formed on a side, distal from the second base substrate 201, of the common electrode 500. One end of the spacer 600 in the liquid crystal handwriting panel 000 is fixed on the second substrate 200, and the other end of the spacer 600 in the liquid crystal handwriting panel 000 is in contact with the first substrate 100. As such, the spacer 600 supports the first substrate 100 the second substrate 200.

Figure 12:
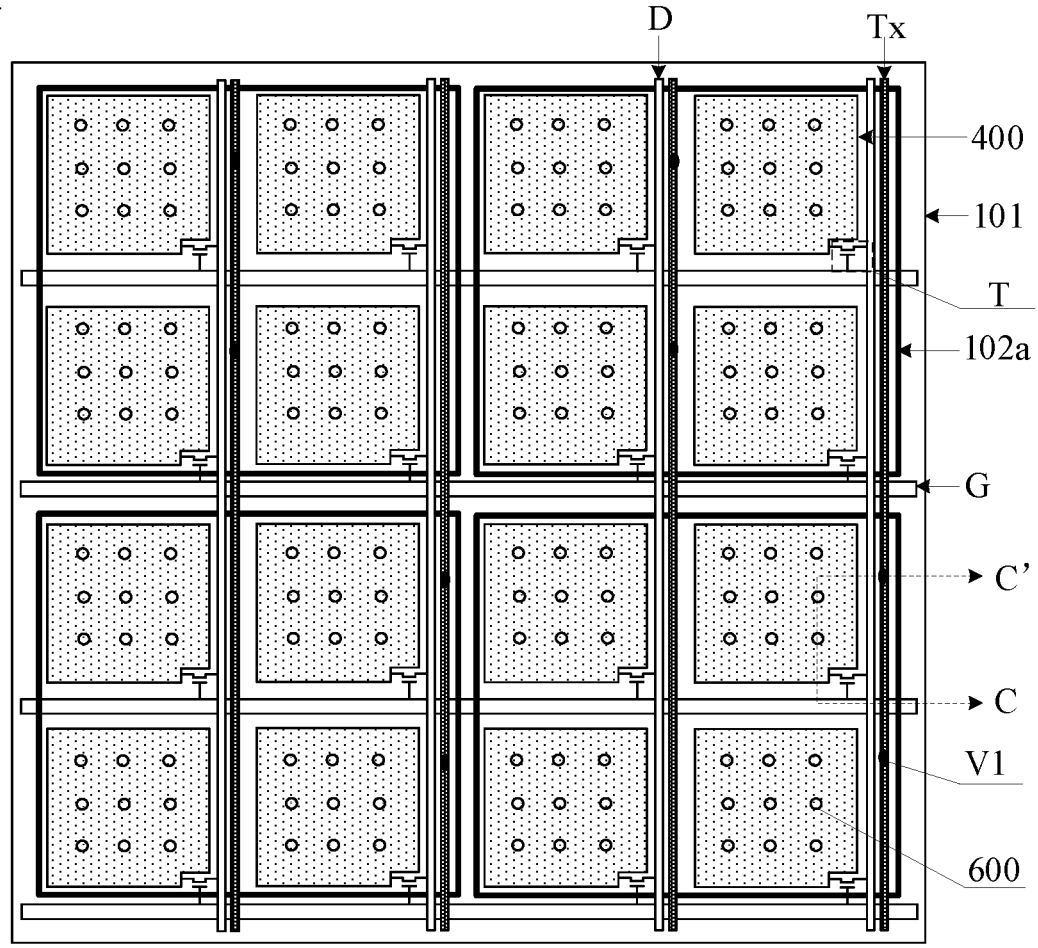
FIG. 12 is a top view of another first substrate in the liquid crystal handwriting panel in FIG. 7.
Figure 13:
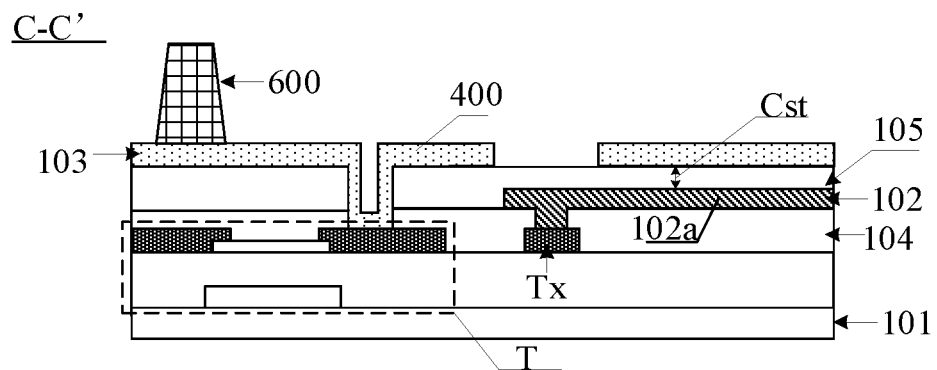
FIG. 13 is a schematic diagram of a film layer structure at C-C' in FIG. 12.

In a second case, in the case that the spacer in the liquid crystal handwriting panel 000 is fixed on the first substrate 100, referring to FIG. 12 and FIG. 13, FIG. 12 is a top view of another first substrate in the liquid crystal handwriting panel in FIG. 7, and FIG. 13 is a schematic diagram of a film layer structure at C-C' in FIG. 12. The spacer 600 in the liquid crystal handwriting panel 000 is formed on a side, distal from the first base substrate 101, of the plurality of pixel electrodes 400. One end of the spacer 600 in the liquid crystal handwriting panel 000 is fixed on the first substrate 100, and the other end of the spacer 600 in the liquid crystal handwriting panel 000 is in contact with the second substrate 200. As such, the spacer 600 supports the first substrate 100 the second substrate 200.

In above two cases, the pixel electrode 400 in the liquid crystal handwriting panel 000 and the spacer 600 are correspondingly disposed. Generally, the spacer 600 in the liquid crystal handwriting panel 000 is disposed based on sizes of the pixel electrodes 400 in the liquid crystal handwriting panel 000 and an amount of the pressure applied on the liquid crystal handwriting panel 000, so as to ensure that the pressures on different positions of the liquid crystal handwriting panel 000 are equal. Illustratively, three rows and three columns of spacers 600 are disposed on one pixel electrode 400, and numbers of spacers 600 on the pixel electrode 400 in the liquid crystal handwriting panel 000 are equal. As such, the plurality of spacers 600 and the plurality of pixel electrodes 400 in the liquid crystal handwriting panel 000 are evenly disposed, such that the stability of the liquid crystal handwriting panel 000 is efficiently improved.

It should be noted that, as the first base substrate 101 in the first substrate 100 is a flexible base substrate, the second base substrate 201 in the second substrate 200 is a rigid base substrate, the spacer 600 is formed on the rigid base substrate but not the flexible base substrate in the case that the spacer 600 is fixed on the second substrate 200, such that the difficulty of manufacturing the liquid crystal handwriting panel 000 is reduced.

In some embodiments, referring to FIG. 7, the control assembly 010 in the liquid crystal handwriting panel 000 includes: a first drive circuit plate 0101 and a control circuit plate 0102. The first drive circuit plate 0101 is electronically connected to the first substrate 100 and the control circuit plate 0102. The first drive circuit plate 0101 is a flexible circuit plate or a chip-on-film with a drive chip. The first drive circuit plate 0101 is configured to drive the liquid crystal handwriting panel 000 to operate, and the control circuit plate 0102 is configured to control the first drive circuit plate 0101 to operate. For example, the control circuit plate 0102 determines the position of the region to be erased by the touch electrode layer 102, and applies the pixel voltage to the pixel electrode in the region to be erased via the first drive circuit plate 0101.

In some embodiments, a periphery of the first substrate 100 includes a binding structure, and the first drive circuit plate 0101 is electronically connected to the binding structure of the first substrate 100 by a binding process. The binding structure is electronically connected to the data lines D, the gate lines G, and the touch signal lines Tx in the first substrate 100. As such, after the first drive circuit plate 0101 is electronically connected to the binding structure, the first drive circuit plate 0101 applies corresponding electric signals to the data line D, the gate line G, and the touch signal line Tx.

It should be noted that, after the first substrate 100 is disposed opposite to the second substrate 200, a conductive adhesive is coated between the first substrate 100 and the second substrate 200. As such, the common electrode 500 in the second substrate 200 is electronically connected to the control circuit plate 0102 by the conductive adhesive and the first drive circuit plate 0101. For example, the common electrode 500 is electronically connected to a reference voltage end in the control circuit plate 0102, such that the reference voltage end applies the common voltage to the common electrode 500.

In the embodiments of the present disclosure, the control circuit plate 0102 in the liquid crystal handwriting panel 000 controls the first drive circuit plate 0101, such that the first drive circuit plate 0101 outputs the touch signal to the plurality of touch signal lines Tx, and the control circuit plate 0102 further positions the position of the contact region of the external object and the first substrate 100. After the control circuit plate 0102 determines the position of the contact region as the position of the region to be erased, the control circuit plate 0102 outputs the gate signal to the plurality of gate lines G by the first drive circuit plate 0101, and outputs the data signal to the plurality of data lines D, such that the pixel voltage is loaded on the pixel electrode 400 in the region to be erased.

Figure 14:
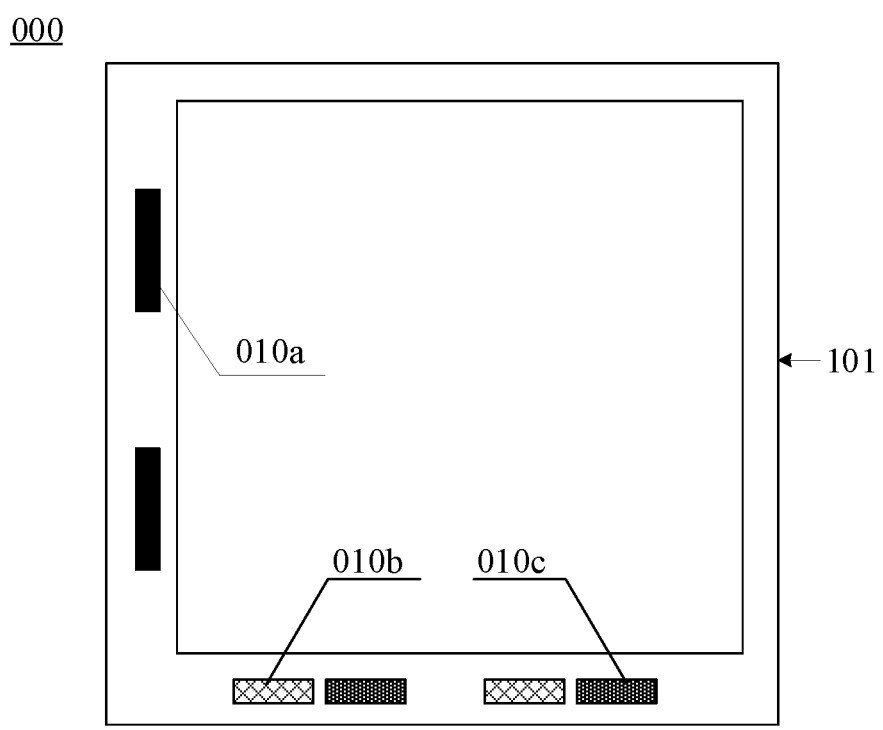
FIG. 14 is a top view of the liquid crystal handwriting panel in FIG. 7.

In some embodiments, as shown in FIG. 14, FIG. 14 is a top view of a first substrate in the liquid crystal handwriting panel in FIG. 7. A gate driver on array (GOA) circuit 010a is disposed on the periphery of the first substrate 100 in the liquid crystal handwriting panel 000, and the GOA circuit 010a is electronically connected to the gate line G and the first drive circuit plate 0101. As such, the first drive circuit plate 0101 is electronically connected to the gate line G by the GOA circuit 010a.

The first drive circuit plate 0101 includes: a source drive circuit plate 010b and a touch drive circuit plate 010c. The source drive circuit plate 010b is electronically connected to the plurality of data lines D, and the touch drive circuit plate 010c is electronically connected to the plurality of touch signal lines Tx.

It should be noted that above embodiments are illustrated by taking the plurality of data lines D being electronically connected to the source drive circuit plate 010b, and the plurality of touch signal lines Tx being electronically connected to the touch drive circuit plate 010c as an example. In some embodiments, the first drive circuit plate 0101 is not divided into the source drive circuit plate 010b and the touch drive circuit plate 010c. As such, the plurality of data lines D and the plurality of touch signal lines Tx are electronically connected to the same circuit plate. Thus, a number of the chips in the liquid crystal handwriting panel 000 is efficiently reduced, and the integration of the liquid crystal handwriting panel 000 is improved.

Figure 15:
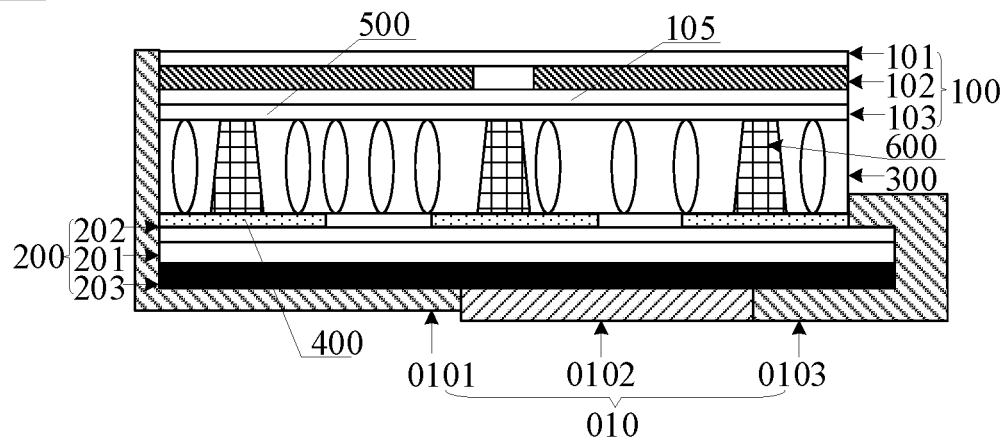
FIG. 15 is a schematic diagram of a film layer structure of another liquid crystal handwriting panel according to some embodiments of the present disclosure.

In the second embodiments, referring to FIG. 15, FIG. 15 is a schematic diagram of a film layer structure of another liquid crystal handwriting panel according to some embodiments of the present disclosure. The first drive electrode layer 103 in the first substrate 100 includes a common electrode 500, and the second drive electrode layer 203 in the second substrate 200 includes a plurality of pixel electrodes 400.

Figure 16:
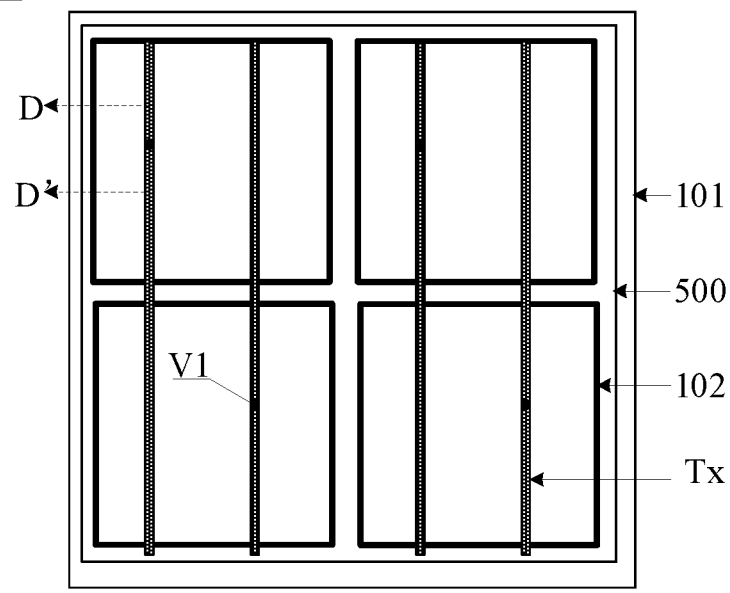
FIG. 16 is a top view of a first substrate in the liquid crystal handwriting panel in FIG. 15.
Figure 17:
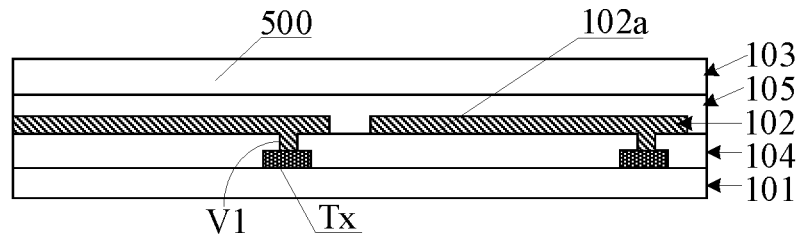
FIG. 17 is a schematic diagram of a film layer structure of the first substrate at D-D' in FIG. 16.

Referring to FIG. 16 and FIG. 17, FIG. 16 is a top view of a first substrate in the liquid crystal handwriting panel in FIG. 15, and FIG. 17 is a schematic diagram of a film layer structure of the first substrate at D-D' in FIG. 16. The plurality of touch signal lines Tx in the first substrate 100 are disposed on the first base substrate 101.

Figure 18:
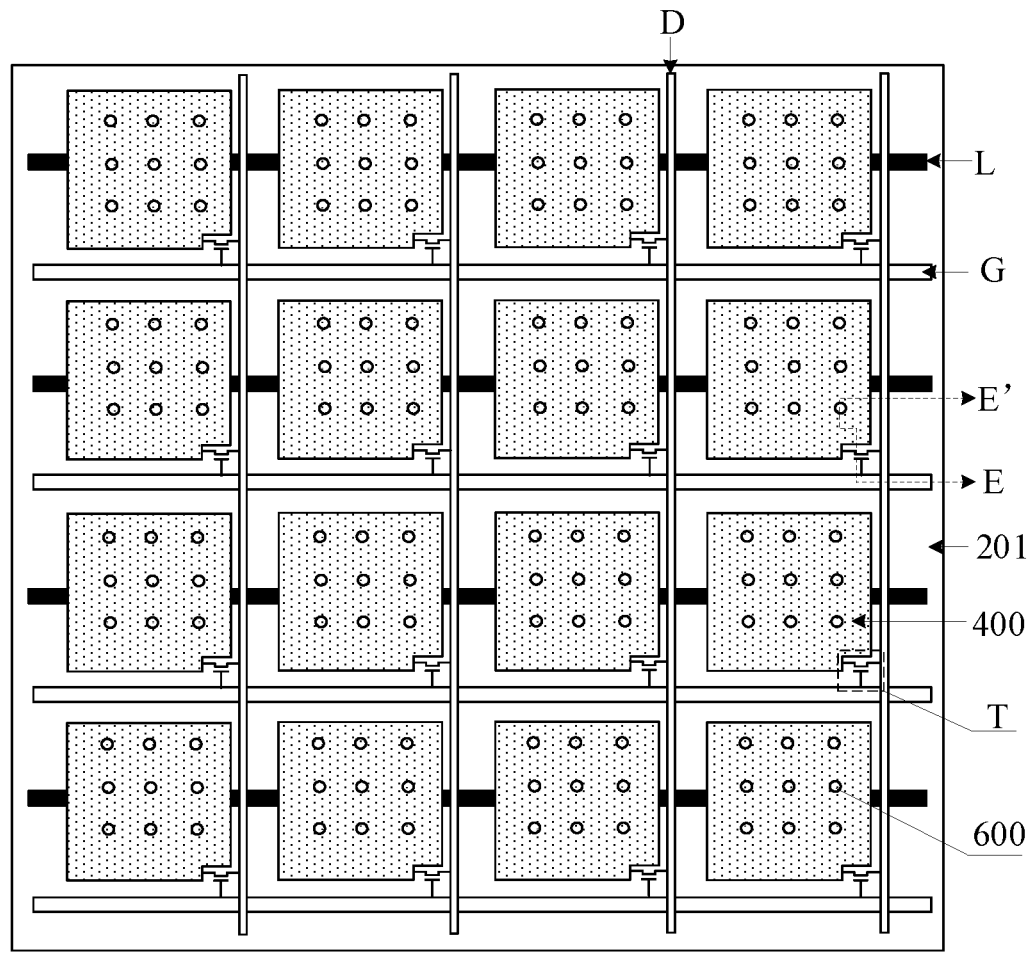
FIG. 18 is a top view of a second substrate in the liquid crystal handwriting panel in FIG. 15.
Figure 19:
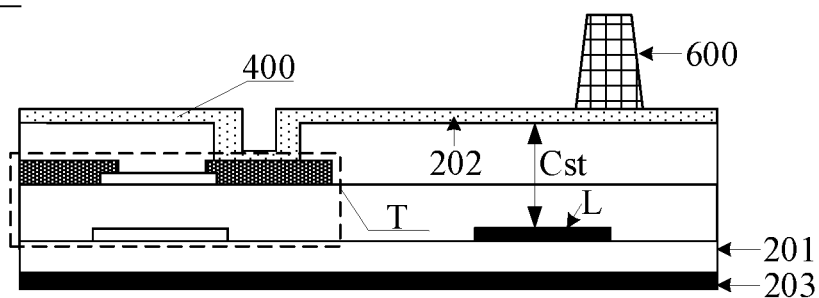
FIG. 19 is a schematic diagram of a film layer structure of the second substrate at E-E' in FIG. 18.

Referring to FIG. 18 and FIG. 19, FIG. 18 is a top view of a second substrate in the liquid crystal handwriting panel in FIG. 15, and FIG. 19 is a schematic diagram of a film layer structure of the second substrate at E-E' in FIG. 18. The second substrate 200 includes: a plurality of data lines D, a plurality of gate lines, and a plurality of thin-film transistors T. It should be noted that, structures of the plurality of data lines D, the plurality of gate lines, and the plurality of thin-film transistors T are referred to corresponding descriptions in above embodiments, which are not repeated in the embodiments of the present disclosure.

It should be noted that, in the case that the plurality of data lines D are disposed in the second substrate 200, and the plurality of touch signal lines Tx are disposed in the first substrate 100, extension directions of the plurality of data lines D are parallel to extension directions of the plurality of touch signal lines Tx, or the extension directions of the plurality of data lines D are perpendicular to the extension directions of the plurality of touch signal lines Tx.

In this case, as the first base substrate 101 in the first substrate 100 is a flexible base substrate, and the second base substrate 201 in the second substrate 200 is a rigid base substrate, in the case that the first drive electrode layer 103 includes the common electrode 500, and the second drive electrode layer 203 includes the plurality of pixel electrodes 400, only the common electrode 500 and the touch electrode layer 102 are formed on the flexible base substrate, and the pixel electrode 400 and the thin-film transistor T are formed on the rigid base substrate. As such, the structure to be formed on the flexible base substrate is simple, the difficulty of manufacturing the first substrate 100 is reduced, and the difficulty of manufacturing the liquid crystal handwriting panel 000 is further reduced.

In the present disclosure, the second substrate 200 further includes: an auxiliary signal line L in the same layer as the gate line G. There are a plurality of auxiliary signal lines L, and an orthogonal projection of each of the plurality of auxiliary signal lines L on the second base substrate 201 is overlapped with an orthogonal projection of one row of pixel electrode 400 on the second base substrate 201. A storage capacitance Cst is formed between the auxiliary signal line L and the pixel electrode 400, and the storage capacitance Cst is used to hold the pixel voltage of the pixel electrode 400. In addition, as the auxiliary signal line L is disposed on the second substrate 200, the ambient light emitted by the bistable liquid crystal molecules at the planar texture is not shielded by the auxiliary signal line L.

In the embodiments of the present disclosure, as shown in FIG. 15, the liquid crystal handwriting panel 000 further includes a spacer 600 between the first substrate 100 and the second substrate 200. The spacer 600 is fixed on one of the first substrate 100 and the second substrate 200. It should be noted that the structure and the principle of the spacer 600 are referred to corresponding descriptions in the first embodiments, which are not repeated in the embodiments of the present disclosure.

In some embodiments, as shown in FIG. 15, the control assembly 010 in the liquid crystal handwriting panel 000 includes: a first drive circuit plate 0101, a second drive circuit plate 0103, and a control circuit plate 0102. The control circuit plate 0102 is electronically connected to the first drive circuit plate 0101 and the second drive circuit plate 0103, and the first drive circuit plate 0101 is electronically connected to the first substrate 100, and the second drive circuit plate 0103 is electronically connected to the second substrate 200. In some embodiments, both the first drive circuit plate 0101 and the second drive circuit plate 0103 are flexible circuit plates or chip-on-films with the drive chip.

The first drive circuit plate 0101 is configured to determine the contact position of the external object and the first substrate by the touch electrode layer 102, the second drive circuit plate 0103 is configured to apply the pixel voltage to the pixel electrode, and the control circuit plate 0102 is configured to control the first drive circuit plate 0101 and the second drive circuit plate 0103 to operate. For example, the control circuit plate 0102 determines the position of the region to be erased by the first drive circuit plate 0101, and applies the pixel voltage to the pixel electrode in the region to be erased by the second drive circuit plate 0103.

In some embodiments, a periphery of the first substrate 100 includes a binding structure, and the first drive circuit plate 0101 is electronically connected to the binding structure of the first substrate 100 by a binding process. The binding structure of the first substrate 100 is electronically connected to the touch signal lines Tx in the first substrate 100. As such, after the first drive circuit plate 0101 is electronically connected to the binding structure of the first substrate 100, the first drive circuit plate 0101 applies the corresponding electric signals to the touch signal lines Tx.

A periphery of the second substrate 200 includes a binding structure, and the second drive circuit plate 0103 is electronically connected to the binding structure of the second substrate 200 by a binding process. The binding structure of the second substrate 200 is electronically connected to the data lines D and the gate lines G in the second substrate 200. As such, after the second drive circuit plate 0103 is electronically connected to the binding structure of the second substrate 200, the second drive circuit plate 0103 applies the corresponding electric signals to the data lines D and the gate lines G.

It should be noted that, after the first substrate 100 is disposed opposite to the second substrate 200, a conductive adhesive is coated between the first substrate 100 and the second substrate 200. As such, the common electrode 500 in the first substrate 100 is electronically connected to the control circuit plate 0102 by the conductive adhesive and the second drive circuit plate 0103. For example, the common electrode 500 is electronically connected to a reference voltage end in the control circuit plate 0102, such that the reference voltage end applies the common voltage to the common electrode 500.

Figure 20:
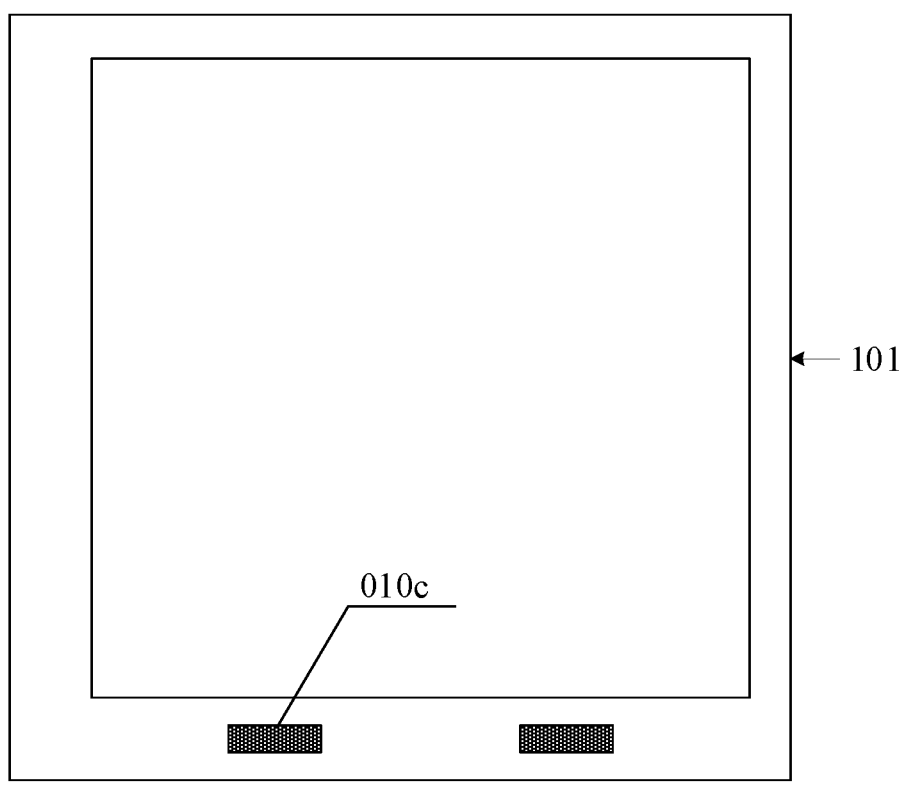
FIG. 20 is a top view of another first substrate in the liquid crystal handwriting panel in FIG. 15.
Figure 21:
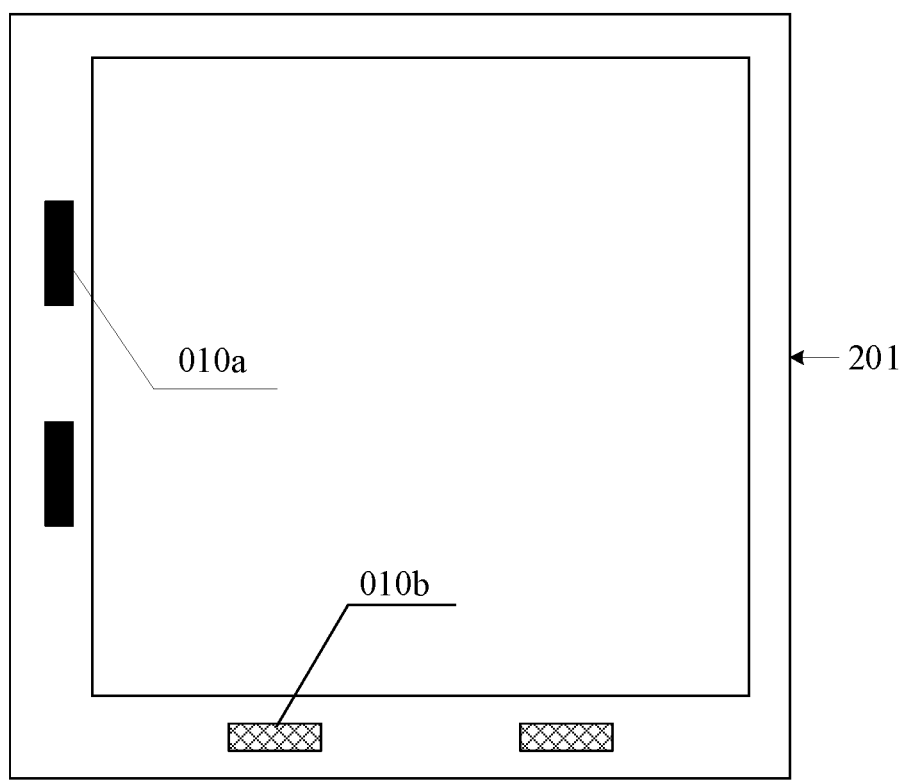
FIG. 21 is a top view of another second substrate in the liquid crystal handwriting panel in FIG. 15.

In some embodiments, as shown in FIG. 20 and FIG. 21, FIG. 20 is a top view of another first substrate in the liquid crystal handwriting panel in FIG. 15, and FIG. 21 is a top view of another second substrate in the liquid crystal handwriting panel in FIG. 15. The first drive circuit plate 0101 in the liquid crystal handwriting panel 000 includes a touch drive circuit plate 010c, and the second drive circuit plate 0103 in the liquid crystal handwriting panel 000 includes a source drive circuit plate 010b. The source drive circuit plate 010b is electronically connected to the plurality of data lines D, and the touch drive circuit plate 010c is electronically connected to the plurality of touch signal lines Tx.

The GOA circuit 010a is disposed on the periphery region of the first substrate 100 in the liquid crystal handwriting panel 000, and the GOA circuit 010a is electronically connected to the gate line G and the second drive circuit plate 0103. As such, the second drive circuit plate 0103 is electronically connected to the gate line G by the GOA circuit 010a.

It should be noted that, the operation principles of the GOA circuit 010a, the source drive circuit plate 010b, and the touch drive circuit plate 010c are referred to the corresponding descriptions in above embodiments, which are not repeated in the embodiments of the present disclosure.

It should be noted that, as the duration of applying the pixel voltage to the pixel electrode by the second drive circuit plate 0103 ranges from 150 ms to 650 ms, a period of sensing the touch position via the touch electrode layer 102 by the first drive circuit plate 0101 ranges from 2 ms to 40 ms, and the binding of the signal applied by the second drive circuit plate 0103 and the signal applied by the first drive circuit plate 0101 is not close, it is not necessary to bind the second drive circuit plate 0103 and the first drive circuit plate 0101. The second drive circuit plate 0103 is only bound with the second substrate 200, and the first drive circuit plate 0101 is only bound with the first substrate 100, such that the difficulty of manufacturing the handwriting device is reduced.

In summary, the liquid crystal handwriting panel provided in the embodiments of the present disclosure includes: a first substrate and a second substrate that are opposite to each other, and a liquid crystal layer between the first substrate and the second substrate. The first substrate in the liquid crystal handwriting panel includes a touch electrode layer. By disposing the touch electrode layer in the first substrate, the position of the contact region of the external object and the first substrate is determined. For example, in the case that the liquid crystal handwriting panel is in an erasing mode, the control assembly determines the position of the contact region of the erasing tool and the first substrate by the touch electrode layer, and the position is a position of the region to be erased. After the control assembly applies a pixel voltage to a pixel electrode in the region to be erased, the handwriting device achieves a function of erasing the handwriting. For example, in the case that the liquid crystal handwriting panel is in a writing mode, the control assembly determines the position of the contact region of the writing tool and the first substrate by the touch electrode layer, and the position is the position of the handwriting. After the control assembly generates image information corresponding to the handwriting, the handwriting device achieves a function of saving the handwriting. The infrared positioning device is not disposed in the liquid crystal handwriting panel, and the touch electrode layer is disposed in the first substrate to achieve a function of saving or erasing the handwriting, such that a thickness of the liquid crystal handwriting panel and weights of borders of the liquid crystal handwriting panel are reduced, and a screen-to-body ratio of the liquid crystal handwriting panel is improved.

Embodiments of the present disclosure further provide a method for controlling the handwriting device, and the method is applicable to the liquid crystal handwriting panel in above embodiments. Illustratively, the liquid crystal handwriting panel is the liquid crystal handwriting panel shown in FIG. 4, FIG. 5, or FIG. 15. The method for controlling the handwriting device includes the following.

In S1, position information of a region to be erased is determined by the touch electrode layer in response to the liquid crystal handwriting panel being in an erasing mode.

In S2, a pixel voltage is applied, based on the position information of the region to be erased, to a pixel electrode in the region to be erased by the control assembly, such that a voltage difference is present between the pixel electrode and the common electrode in the region to be erased.

In some embodiments, the method for controlling the handwriting device further includes:
determining, in response to the liquid crystal handwriting panel being in a writing mode, position information of handwriting by the touch electrode layer, and generating image information corresponding to the handwriting.

In some embodiments, the method for controlling the handwriting device further includes:
determining a mode of the liquid crystal handwriting panel by detecting an external object in contact with the first substrate by the touch electrode layer;
determining, in response to the liquid crystal handwriting panel being in the erasing mode, position information of the external object in contact with the first substrate as the position information of the region to be erased; and
determining, in response to the liquid crystal handwriting panel being in the writing mode, position information of the external object in contact with the first substrate as the position information of the handwriting.

In some embodiments, determining the mode of the liquid crystal handwriting panel by detecting the external object in contact with the first substrate by the touch electrode layer includes:
determining the mode of the liquid crystal handwriting panel by detecting an area of a contact region of the external object and the first substrate by the touch electrode layer, and/or a change of a capacitance in response to the external object being in contact with the first substrate.

It is obvious for those skilled in the art to understand that, above specific operation principles of the method for controlling the handwriting device are referred to corresponding descriptions in the structure of the liquid crystal handwriting panel in above embodiments for convenient and simply description, which are not repeated herein.

It is noted that in the accompanying drawings, the sizes of the layers and regions are exaggerated for clear illustration. In addition, it is understood that when an element or a layer is disposed "on" another element or layer, the element is directly disposed on the another element or there is an intervening layer. In addition, it is understood that when an element or a layer is disposed "under" another element or layer, the element is directly disposed under the another element or there are more than one intervening layer or element. In addition, it is further understood that when a layer or an element is disposed "between" two layers or elements, the layer or element is the only one layer between the two layers or elements or there are more than one intervening layer or element. Similar reference numerals indicate similar elements throughout the present disclosure.

In the present disclosure, the terms "first" and "second" are used to descriptive purposes, and are not construed to indicate or imply relative importance. Unless expressly limited otherwise, the term "a plurality of" refers to two or more.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A liquid crystal handwriting panel, comprising: a first substrate and a second substrate that are opposite to each other, and a liquid crystal layer between the first substrate and the second substrate; wherein
the first substrate comprises: a first base substrate, a touch electrode layer on a side of the first base substrate, and a first drive electrode layer on a side of the first base substrate, wherein the first drive electrode layer is closer to the liquid crystal layer than the touch electrode layer to the liquid crystal layer; and
the second substrate comprises: a second base substrate, a second drive electrode layer on a side of the second base substrate, and a shielding layer on a side of the second base substrate;
wherein the first drive electrode layer comprises a plurality of pixel electrodes, and the second drive electrode layer comprises a common electrode,
wherein the touch electrode layer comprises: a plurality of touch electrode blocks, wherein an orthogonal projection of each of the plurality of touch electrode blocks on the first base substrate is overlapped with an orthogonal projection of at least one of the plurality of pixel electrodes on the first base substrate; and
the first substrate further comprises: a plurality of touch signal lines, wherein the plurality of touch signal lines are electrically connected to the plurality of touch electrode blocks in one-to-one correspondence,
wherein the first substrate further comprises: a second insulation layer between the first drive electrode layer and the touch electrode layer, wherein the touch electrode layer is closer to the first base substrate than the first drive electrode layer to the first base substrate, and wherein the liquid crystal layer is a bistable liquid crystal molecule layer.

2. The liquid crystal handwriting panel according to claim 1, wherein in a case that the first drive electrode layer comprises the plurality of pixel electrodes, the first substrate further comprises: a plurality of data lines and a plurality of thin-film transistors, wherein the plurality of data lines are electrically connected to the plurality of pixel electrodes by the plurality of thin-film transistors, and the plurality of data lines and the plurality of touch signal lines are disposed on a same layer and made of a same material.

3. The liquid crystal handwriting panel according to claim 1, wherein the first substrate further comprises: a first insulation layer between the plurality of touch signal lines and the touch electrode layer, wherein the first insulation layer is provided with a plurality of first vias, and the plurality of touch signal lines are electrically connected to the plurality of touch electrode blocks by at least one of the plurality of first vias.

4. The liquid crystal handwriting panel according to claim 1, further comprising: a spacer between the first substrate and the second substrate, wherein the spacer is fixed on one of the first substrate and the second substrate.

5. The liquid crystal handwriting panel according to claim 1, wherein the first base substrate is a flexible base substrate, and both the touch electrode layer and the first drive electrode layer are disposed on a side, close to the second substrate, of the flexible base substrate.

6. A handwriting device, comprising: a liquid crystal handwriting panel, and a control assembly electrically connected to the liquid crystal handwriting panel; wherein
the liquid crystal handwriting panel comprises: a first substrate and a second substrate that are opposite to each other, and a liquid crystal layer between the first substrate and the second substrate; wherein
the first substrate comprises: a first base substrate, a touch electrode layer on a side of the first base substrate, and a first drive electrode layer on a side of the first base substrate, wherein the first drive electrode layer is closer to the liquid crystal layer than the touch electrode layer to the liquid crystal layer; and
the second substrate comprises: a second base substrate, a second drive electrode layer on a side of the second base substrate, and a shielding layer on a side of the second base substrate;
wherein the first drive electrode layer comprises a plurality of pixel electrodes, and the second drive electrode layer comprises a common electrode;
and the control assembly is configured to: determine, in response to the liquid crystal handwriting panel being in an erasing mode, position information of a region to be erased by the touch electrode layer, and apply a pixel voltage to a pixel electrode in the region to be erased, such that a voltage difference is present between the pixel electrode and the common electrode in the region to be erased,
wherein the touch electrode layer comprises: a plurality of touch electrode blocks, wherein an orthogonal projection of each of the plurality of touch electrode blocks on the first base substrate is overlapped with an orthogonal projection of at least one of the plurality of pixel electrodes on the first base substrate; and
the first substrate further comprises: a plurality of touch signal lines, wherein the plurality of touch signal lines are electrically connected to the plurality of touch electrode blocks in one-to-one correspondence,
wherein the first substrate further comprises: a second insulation layer between the first drive electrode layer and the touch electrode layer, wherein the touch electrode layer is closer to the first base substrate than the first drive electrode layer to the first base substrate, and wherein the liquid crystal layer is a bistable liquid crystal molecule layer.

7. The handwriting device according to claim 6, wherein the control assembly is further configured to: determine, in response to the liquid crystal handwriting panel being in a writing mode, position information of handwriting by the touch electrode layer, and generate image information corresponding to the handwriting.

8. The handwriting device according to claim 7, wherein a duration of applying the pixel voltage to the pixel electrode by the control assembly ranges from 150 ms to 650 ms, and a period of sensing a touch position via the touch electrode layer by the control assembly ranges from 2 ms to 40 ms.

9. A method for controlling a handwriting device, applicable to the handwriting device as defined in claim 6, the method comprising:
determining, in response to the liquid crystal handwriting panel being in an erasing mode, position information of a region to be erased by the touch electrode layer; and
applying, based on the position information of the region to be erased, a pixel voltage to a pixel electrode in the region to be erased by the control assembly, such that a voltage difference is present between the pixel electrode and the common electrode in the region to be erased.

10. The method according to claim 9, further comprising:
determining, in response to the liquid crystal handwriting panel being in a writing mode, position information of handwriting by the touch electrode layer, and generating image information corresponding to the handwriting.

11. The method according to claim 10, further comprising:
determining a mode of the liquid crystal handwriting panel by detecting an external object in contact with the first substrate by the touch electrode layer;
determining, in response to the liquid crystal handwriting panel being in the erasing mode, position information of the external object in contact with the first substrate as the position information of the region to be erased; and
determining, in response to the liquid crystal handwriting panel being in the writing mode, position information of the external object in contact with the first substrate as the position information of the handwriting.

12. The method according to claim 11, wherein determining the mode of the liquid crystal handwriting panel by detecting the external object in contact with the first substrate by the touch electrode layer comprises:
determining the mode of the liquid crystal handwriting panel by detecting an area of a contact region of the external object and the first substrate by the touch electrode layer, and/or a change of a capacitance in response to the external object being in contact with the first substrate.

13. The handwriting device according to claim 6, wherein in a case that the first drive electrode layer comprises the plurality of pixel electrodes, the first substrate further comprises: a plurality of data lines and a plurality of thin-film transistors, wherein the plurality of data lines are electrically connected to the plurality of pixel electrodes by the plurality of thin-film transistors, and the plurality of data lines and the plurality of touch signal lines are disposed on a same layer and made of a same material.

14. The handwriting device according to claim 6, wherein the first substrate further comprises: a first insulation layer between the plurality of touch signal lines and the touch electrode layer, wherein the first insulation layer is provided with a plurality of first vias, and the plurality of touch signal lines are electrically connected to the plurality of touch electrode blocks by at least one of the plurality of first vias.

15. The handwriting device according to claim 6, further comprising: a spacer between the first substrate and the second substrate, wherein the spacer is fixed on one of the first substrate and the second substrate.

* * * * *